US006999272B2

(12) United States Patent
Imaino et al.

(10) Patent No.: US 6,999,272 B2
(45) Date of Patent: Feb. 14, 2006

(54) APPARATUS AND METHOD TO IMPROVE READ/WRITE SPEED OF DISK DRIVE SYSTEM

(75) Inventors: Wayne Isami Imaino, San Jose, CA (US); Tatsuo Nakamoto, Sagamihara (JP); Shingo Tsuda, Yokohama (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 10/873,737

(22) Filed: Jun. 22, 2004

(65) Prior Publication Data

US 2004/0233574 A1 Nov. 25, 2004

Related U.S. Application Data

(62) Division of application No. 09/964,128, filed on Sep. 26, 2001, now Pat. No. 6,795,270.

(30) Foreign Application Priority Data

Sep. 27, 2000 (JP) ............................ 2000-295006

(51) Int. Cl.
*G11B 17/02* (2006.01)

(52) U.S. Cl. .................................................. 360/97.01

(58) Field of Classification Search .................... None
See application file for complete search history.

(56) References Cited

U.S. PATENT DOCUMENTS

| | | | | |
|---|---|---|---|---|
| 6,034,840 | A * | 3/2000 | Yamamoto et al. ...... | 360/97.01 |
| 6,445,534 | B1 * | 9/2002 | Tsuda et al. ............ | 360/97.01 |
| 6,490,123 | B1 * | 12/2002 | Okunaga et al. ......... | 360/97.01 |

* cited by examiner

*Primary Examiner*—Robert S. Tupper
(74) *Attorney, Agent, or Firm*—Robert B. Martin; Duke Amaniampong; Dillon & Yudell LLP

(57) ABSTRACT

A disk drive system and method for implementing the same. The disk drive system of the present invention includes a discoid medium which rotates about its rotation axis and stores data. An actuator includes a head for reading or writing data from or in the discoid medium as it bidirectionally rotates about its bidirectional-rotation axis. The disk drive system further includes a housing which has a predetermined width and houses the discoid medium and the actuator, wherein the rotation axis of the discoid medium and the bidirectional-rotation axis of the actuator are arranged at the center in the width direction of the housing, and wherein size of the discoid medium is smaller than that of a discoid medium corresponding to a form factor of the housing.

2 Claims, 10 Drawing Sheets

APPARATUS AND METHOD TO IMPROVE READ/WRITE SPEED OF DISK DRIVE SYSTEM

This is a Division of application Ser. No. 09/964,128, filed Sept. 26, 2001, now U.S. Pat. No. 6,795,270.

BACKGROUND OF THE INVENTION

1. Technical Field

The present invention relates generally to a disk drive system, and in particular to a method and apparatus for increasing effective storage capacity and read/write access speed by suppressing rotational tilt of hard disk drives.

2. Description of the Related Art

A hard disk drive (hereafter referred to as HDD) has a structure in which one or more magnetic disks are arranged on the same axis so as to be driven by a spindle motor. Data is read or written by a magnetic head provided so as to face the magnetic disk and the magnetic head is driven by an actuator, generally driven by a voice coil motor (hereafter referred to as VCM). The magnetic disk, magnetic head, and actuator are housed in a housing referred to as enclosure case.

Improving a storage capacity and read/write speed of a magnetic disk is a constant technological goal. In the case of the latter, it is possible to improve data read/write speed by shortening the seek time for a magnetic head to move to a necessary track on a magnetic disk. Because a magnetic head is driven by a VCM as described above, it is possible to increase a seek speed by improving the performance of the VCM. To improve the performance of a VCM, it is only necessary to change a permanent magnet constituting the VCM to one having a stronger magnetic characteristic or increase the thickness of the magnet to increase a magnetic field to be applied to a voice coil. However, improvement of the magnetic characteristic of a permanent magnet approaches a limit. Moreover, in the case of an HDD whose space must be decreased, there is a limit in further increasing the thickness of a permanent magnet from the current thickness.

It is possible to improve the data read/write speed by increasing the rotational speed of a magnetic disk. However, when increasing the rotational speed of a magnetic disk, the flutter of a magnetic head is increased. The flutter is a phenomenon in which a magnetic head is deflected in the radius direction of a magnetic disk due to the flow of air caused by rotation of the magnetic disk. When the flutter occurs, the relative positional relation between a magnetic disk and a magnetic head unnecessarily fluctuates and therefore, increase of the flutter value affects the data read/write accuracy. That is, data may be written in a track different from a track in which the data should be originally written or read from a track different from a track from which the data should be originally read. Particularly, by improving the storage density of a magnetic disk in order to increase the capacity of the disk, the above trend becomes more remarkable. For this problem, an art for attaching a damper to a magnetic-head slider is effective.

Furthermore, increasing the rotational speed of a magnetic disk results in increased power consumption. That is, when the rotational speed of a magnetic disk is increased, the windage loss to the rotation of the magnetic disk increases and thereby, the power consumed by a spindle motor for rotating the magnetic disk increases. For increase of power consumption due to increase of the rotation of a magnetic disk, it is effective to decrease the magnetic disk in diameter. By decreasing a magnetic disk in diameter, the storage capacity may be decreased. However, decrease of the storage capacity is almost prevented by the recent density-increase art.

SUMMARY OF THE INVENTION

The present invention provides a disk drive system comprising a discoid medium which rotates about its rotation axis and stores data, an actuator which has a head for reading or writing data from or in the discoid medium and rotates about its bidirectional-rotation axis, and a housing which has predetermined width and depth and houses the discoid medium and the actuator, characterized in that the bidirectional-rotation axis of the actuator is set eccentrically in the rotational direction of the discoid medium from the width-directional center of the housing and the size of the discoid medium is smaller than that of a discoid medium corresponding to the form factor of the housing.

All objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention is directed toward providing a system and method applicable within a structure of an HDD for suppressing a thermal tilt. A thermal tilt is caused by the difference between linear-expansion coefficients of parts constituting an HDD. An enclosure case of an HDD is constituted of a shallow-bottom boxy member referred to as base and a flat member referred to as top cover. The enclosure case is generally made of aluminum-alloy casting and the top cover is generally made of damping steel sheet or stainless steel. An actuator to which a magnetic head is set uses a pivot as a bidirectional-rotation axis and the pivot is fixed to the base and top cover. The pivot is designed so as to be set vertically to the base or top cover. However, a base and a top cover made of materials different from each other are different from each other in linear-expansion coefficient. Therefore, a pivot whose both ends are supported by a base and a top cover may be tilted due to the fact that the linear expansion produced in the base is different from that produced in the top cover when the temperature of the environment in which an HDD operates rises. A tilt of a pivot is one of causes of a thermal tilt.

Figure 4A:
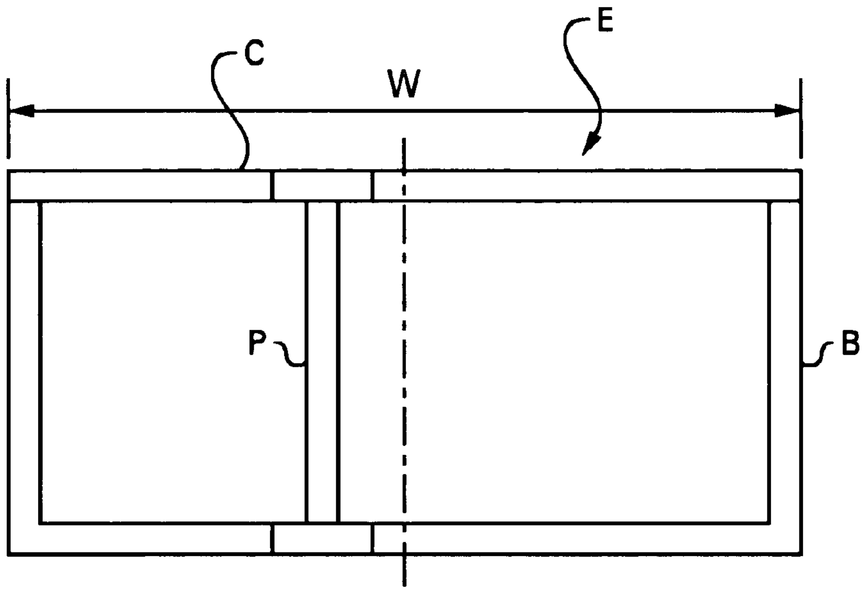
FIGS. 4A and 4B are illustrations for explaining a reason why a thermal tilt occurs in a conventional HDD.
Figure 4B:
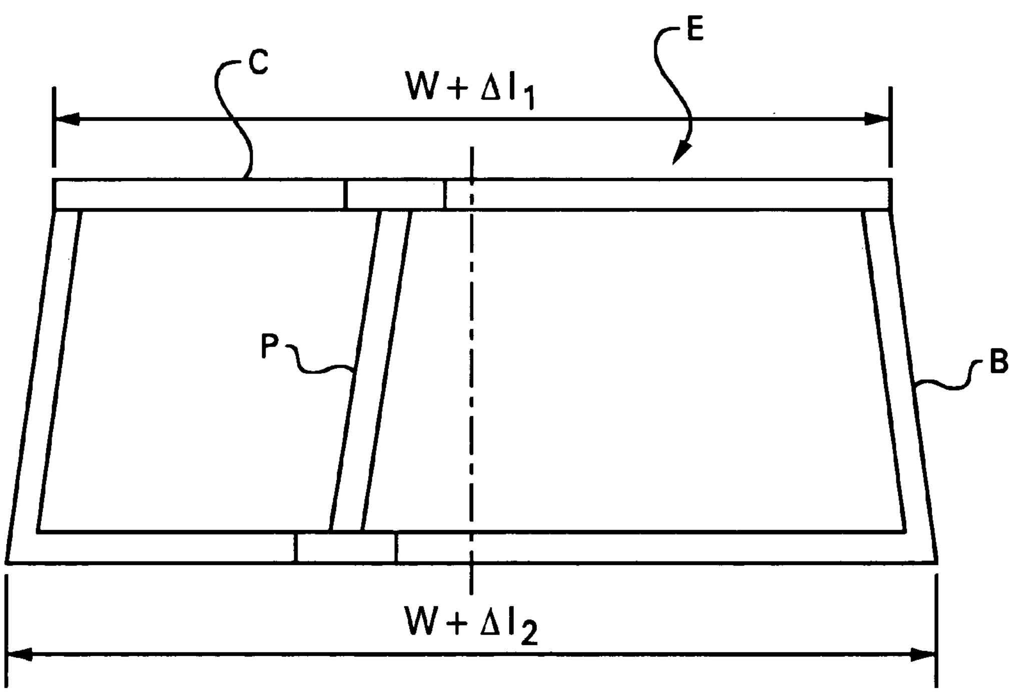

A tilt of a pivot is described by referring to FIG. 4. FIG. 4 is a schematic illustration showing a support structure of a pivot P by an enclosure case E of an HDD. The enclosure case E is constituted of a top cover C and a base B. In the case of this example, it is assumed that the base B has a linear-expansion coefficient larger than that of the top cover C and the enclosure case E has a width W. The upper end and lower end of the pivot P are fixed to and supported by the top cover C and the base B. FIG. 4A shows a state in a temperature area T1 in which the HDD is assembled and FIG. 4B shows a state in which temperature becomes higher than T1. In the temperature area T1 in which the HDD is assembled, the pivot P is set vertically to the top cover C (or base B). When temperature rises from the temperature area T1, the width of the top cover C becomes $W+\Delta 1_1$ and the width of the base B becomes $W+\Delta 1_2$, due to linear expansion. In this case, because the base B has a linear-expansion coefficient larger than that of the top cover C, $W+\Delta 1_1$ becomes smaller than $W+\Delta 1_2$ as shown in FIG. 4B. Moreover, the pivot P is tilted due to the difference between linear expansion values of the top cover C and base B as shown in FIG. 4B and a thermal tilt occurs.

The thermal tilt is caused by the difference between linear-expansion coefficients of the top cover C and the base B. However, the present inventor found that there was other cause. In the case of the example shown in FIG. 4, the pivot P is set to a position decentered from the width-W-directional center of the enclosure case E and thereby, a tilt occurs. That is, it is possible to prevent the pivot P from tilting depending on the position of the pivot P even if the top cover C and the base B are different from each other in linear-expansion coefficient. This is explained below by referring to FIG. 3.

Figure 3A:
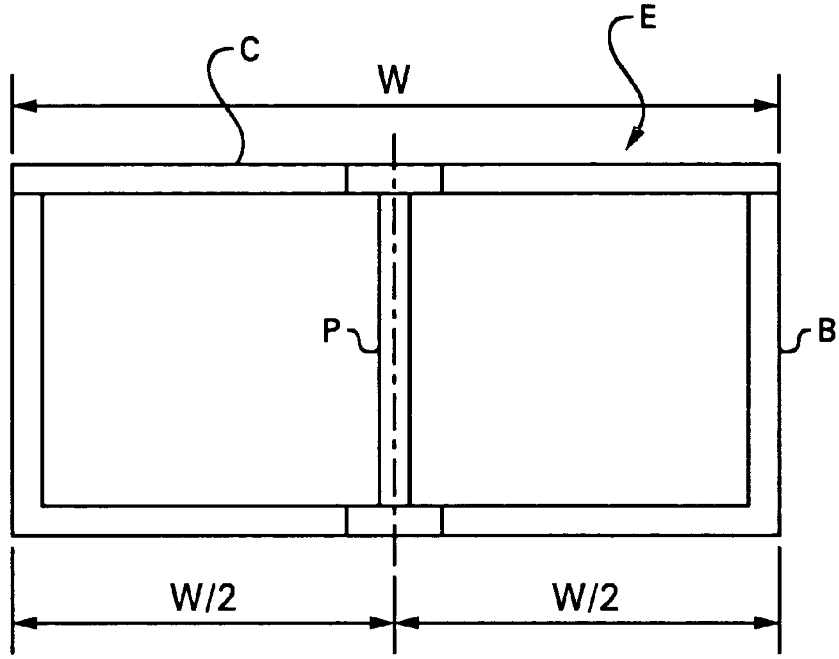
FIGS. 3A and 3B are illustrations for explaining a reason why a thermal tilt does not easily occur in the HDD of the present invention.
Figure 3B:
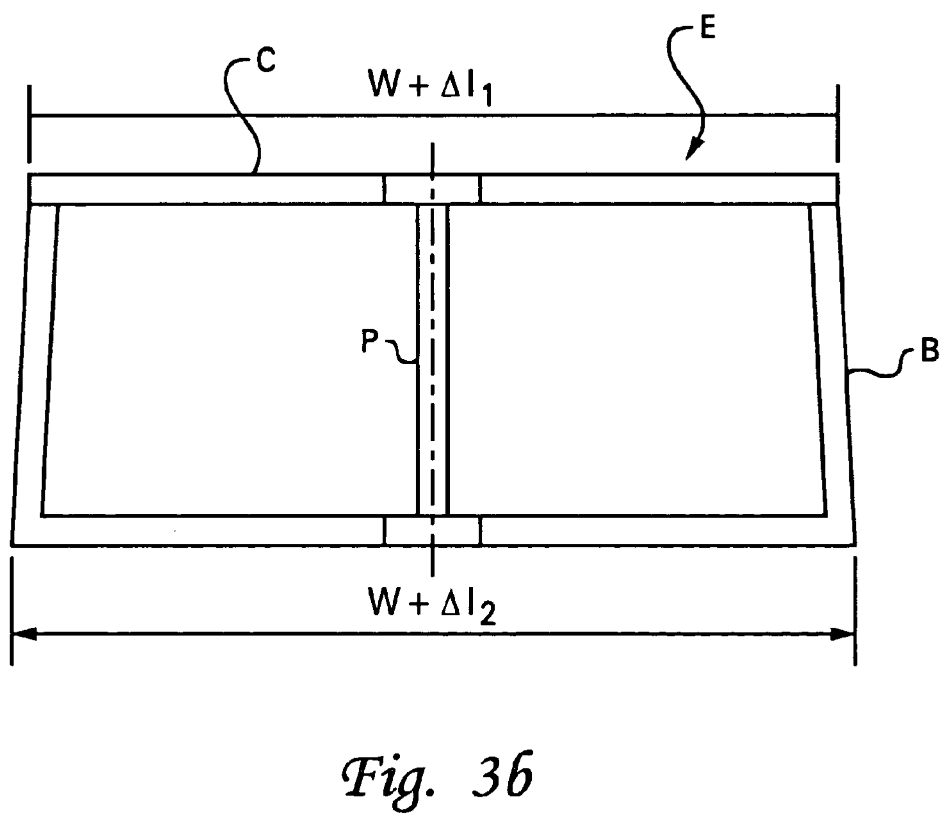

FIG. 3 is also an illustration schematically showing a support structure of the pivot P by the enclosure case E of an HDD similarly to the case of FIG. 4. FIG. 3 is different from FIG. 4 in that distances from the pivot P up to the both ends of the enclosure case E are equalized in W/2. That is, the pivot P is set to the width-W-directional center of the enclosure case E. When temperature rises from the temperature area T1 (FIG. 3A), the width of the top cover C becomes $W+\Delta 1_1$ and that of the base B becomes $W+\Delta 1_2$. However, because the pivot P is set to the width-W-directional center of the enclosure case E, positions of the upper and lower ends of the pivot P are not relatively changed. Therefore, the pivot P does not tilt.

A disk drive system of the present invention is set forth herein based on the above knowledge and includes: a discoid medium which rotates about the center of its rotation axis and stores data; an actuator which has a head for reading or writing data from or in the discoid medium and bidirectionally rotates about its bidirectional-rotation axis; and a housing which has a predetermined width and houses the discoid medium and the actuator, characterized in that the rotation axis of the discoid medium and the bidirectional-rotation axis of the actuator are set to the width-directional center of the housing and the size of the discoid medium is smaller than that of a discoid medium corresponding to the form factor of the housing.

In the case of a disk drive system of the present invention, the rotation axis of the discoid medium and the bidirectional-rotation axis of the actuator are set to the width-directional center of the housing. Therefore, even if a housing is made of materials different from each other in linear-expansion coefficient, tilts of the rotation axis of the discoid medium and the bidirectional-rotation of the actuator in the width direction are suppressed. Therefore, occurrence of a thermal tilt is suppressed. In the case of an conventional disk drive system, particularly an HDD, the rotation axis of a magnetic disk has been frequently located at the width-directional center of an enclosure case. However, a pivot serving as the bidirectional-rotation axis of an actuator has not been located at the width-directional center of the enclosure case but it has been set to a position eccentric in the direction opposite to the rotational direction of the magnetic disk.

In the case of a disk drive system of the present invention, the size of the discoid medium is smaller than that of a discoid medium corresponding to the form factor of the housing. Therefore, even when rotating the discoid medium at a high speed, it is possible to suppress the increase of the power consumption. Moreover, because the size of the discoid medium is small, it is possible to form a new space on the housing. It is also possible to increase the capacity of an actuator by using the space and improve the seek speed of a head.

When a disk drive system of the present invention has a form factor of 3.5", it is preferable to set the outside diameter of a discoid medium to 75 mm or less. The form factor represents a factor about a form such as a shape or size. In the case of an HDD, for example, three form factors of 5.25", 3.5", and 2.5" are used at present. Standard widths except a tolerance are 5.75" (146.05 mm) for the form factor of 5.25", 4.0" (101.6 mm) for the form factor of 3.5", and 2.75" (68.95 mm) for the form factor of 2.5". Even if a form factor is 3.5", a magnetic disk to be mounted on an HDD does not have a diameter of 3.5". In general, a magnetic disk of 95 mm (3.74") is mounted on an HDD having a 3.5" form factor. That is, a magnetic disk corresponding to a 3.5" HDD has an outside diameter of 95 mm. The 3.5" HDD has a rotational speed of 7,200 rpm. However, the present invention proposes to set the outside diameter of a discoid medium to 75 mm or less when a form factor is 3.5". Thereby, even if a high rotational speed whose rated rotational speed exceeds 12,000 rpm is used, it is possible to suppress the power consumption. However, when the diameter of a discoid medium decreases, the data storage capacity also decreases by a value equivalent to the decrease of the diameter of the discoid medium. Therefore, when considering the above described, it is preferable to set the outside diameter of a discoid medium to 65 mm or more. However, when the storage density of a discoid medium is remarkably improved, it is needless to say that a diameter smaller than 65 mm can be used.

In the case of a disk drive system of the present invention, it is preferable that an actuator has a line-symmetric shape in its planar direction. This is because a head is not easily shifted in the diameter direction (off-track direction) of a discoid medium when the actuator has a line-symmetric shape even if the actuator vibrates. Particularly, in the case of a high-speed disk drive system intended by the present invention, a shift of a head in the off-track direction affects acceleration of data write or read in or from a desired track.

Moreover, the present invention provides a disk drive system including: a discoid medium which rotates about its rotation axis and stores data; an actuator which has a head for reading or writing data from or in the discoid medium and bidirectionally rotates about its bidirectional-rotation axis; and a housing which is constituted of a boxy base and a flat cover made of materials different from each other in linear-expansion coefficient and houses the discoid medium and the actuator, characterized in that a structure in which tilts of the rotation axis and bidirectional-rotation axis in the housing-width direction based on the difference between linear-expansion coefficients are suppressed is used and the size of the discoid medium is smaller than that of a discoid medium corresponding to the form factor of the housing.

Figure 5A:
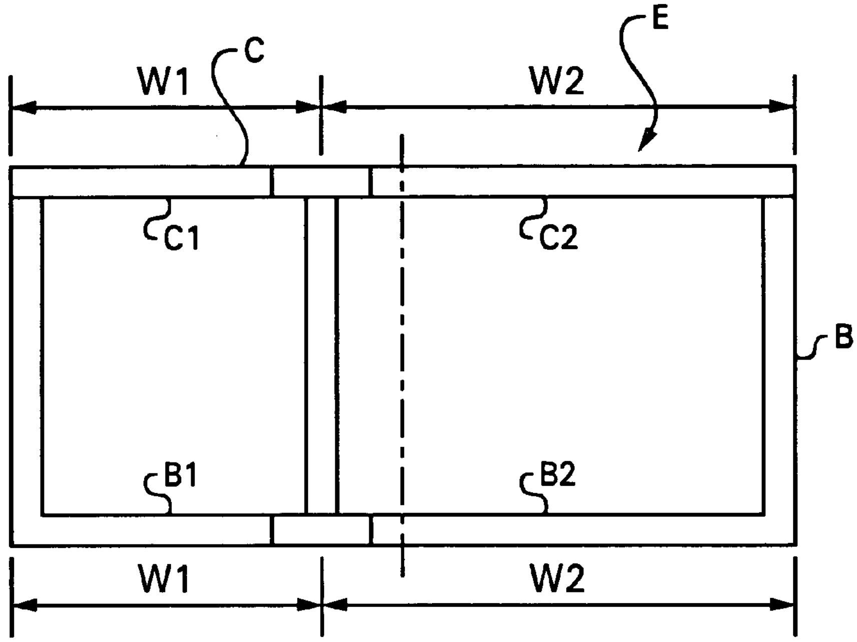
FIGS. 5A and 5B are illustrations for explaining a reason why a thermal tilt does not easily occur in the HDD of the present invention.
Figure 5B:
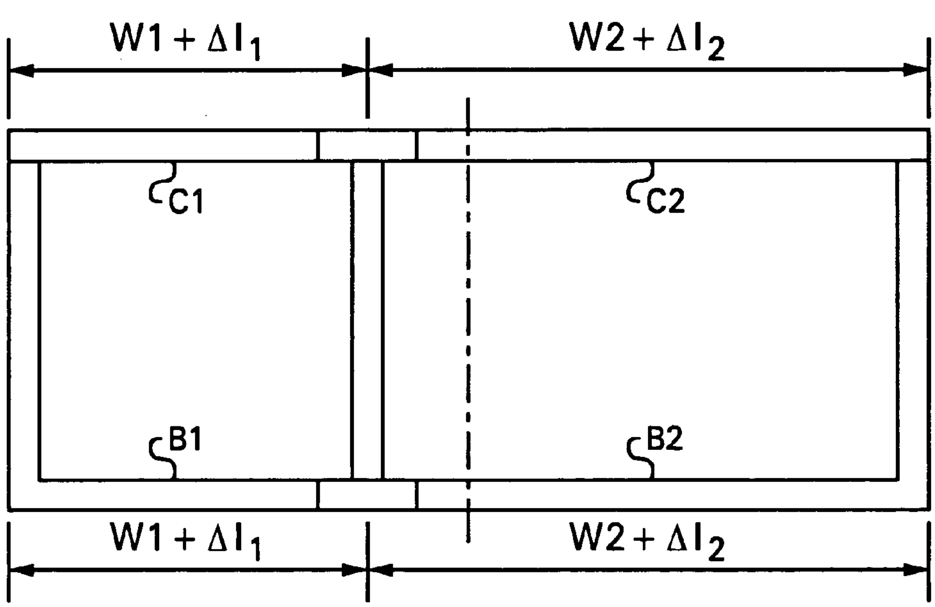

In the case of the present invention, there are at least two structures for respectively suppressing tilts of a rotation axis and a bidirectional-rotation axis in a housing-width direction due to the difference between linear-expansion coefficients. One of the structures is a structure in which distances from a rotation axis up to width-directional both margins of a housing are equalized and distances from a bidirectional-rotation axis up to width-directional both margins of the housing are equalized. According to this structure, housing-width-directional tilts of a rotation axis and a bidirectional-rotation axis are suppressed because a structure is used which is the same as the above-described structure in which the rotation axis of the discoid medium and the bidirectional-rotation axis of the actuator are set to the width-directional center of the housing. The other structure of them is a structure in which linear-expansion coefficients from a rotation axis up to width-directional both margins of a housing are equalized and linear-expansion coefficients from a bidirectional-rotation axis up to width-directional both margins of the housing are equalized. This structure also makes it possible to suppress housing-width-directional tilts of a rotation axis and a bidirectional-rotation axis. As shown in FIGS. 5A and 5B, this structure can be used even if the rotation axis of a discoid medium and the bidirectional-rotation axis of an actuator are decentered from the width-directional center of a housing. In the case of the example in FIG. 5, the rotation axis of the discoid medium and the bidirectional-rotation axis of the actuator are set to a position W1 from the left side face of the housing and a position W2 from the right side face of the housing. Examples shown in FIGS. 3 and 4 assume that the top cover C and the base B are respectively constituted of a single material. However, in the case of the example in FIG. 5, it is possible to equalize linear expansions of C1 portion of the top cover C and B1 portion of the base B at $\Delta 1_1$ and equalize linear expansions of C2 portion of the top cover C and B2 portion of the base B at $\Delta 1_2$ by constituting C1 and C2 portions of the top cover C of materials different from each other and B1 and B2 portions of the base B of materials different from each other.

The present invention also addresses the need for an HDD having improved arm rigidity. As previously described, it is preferable to increase the thickness or width of an arm in order to improve the rigidity of the arm. However, to increase the thickness of the arm, it is necessary to increase the interval between magnetic disks. Therefore, it is difficult to use the above structure for an HDD mounting many magnetic disks. Therefore, the present inventor studied increase of the width of the arm so as not to be influenced by the mounted number of magnetic disks. As a result, the inventor obtained a conclusion that the width of the arm could be increased by setting the bidirectional-rotation axis of an actuator eccentrically in the rotational direction of a discoid medium from the width-directional center of a housing.

Figure 8:
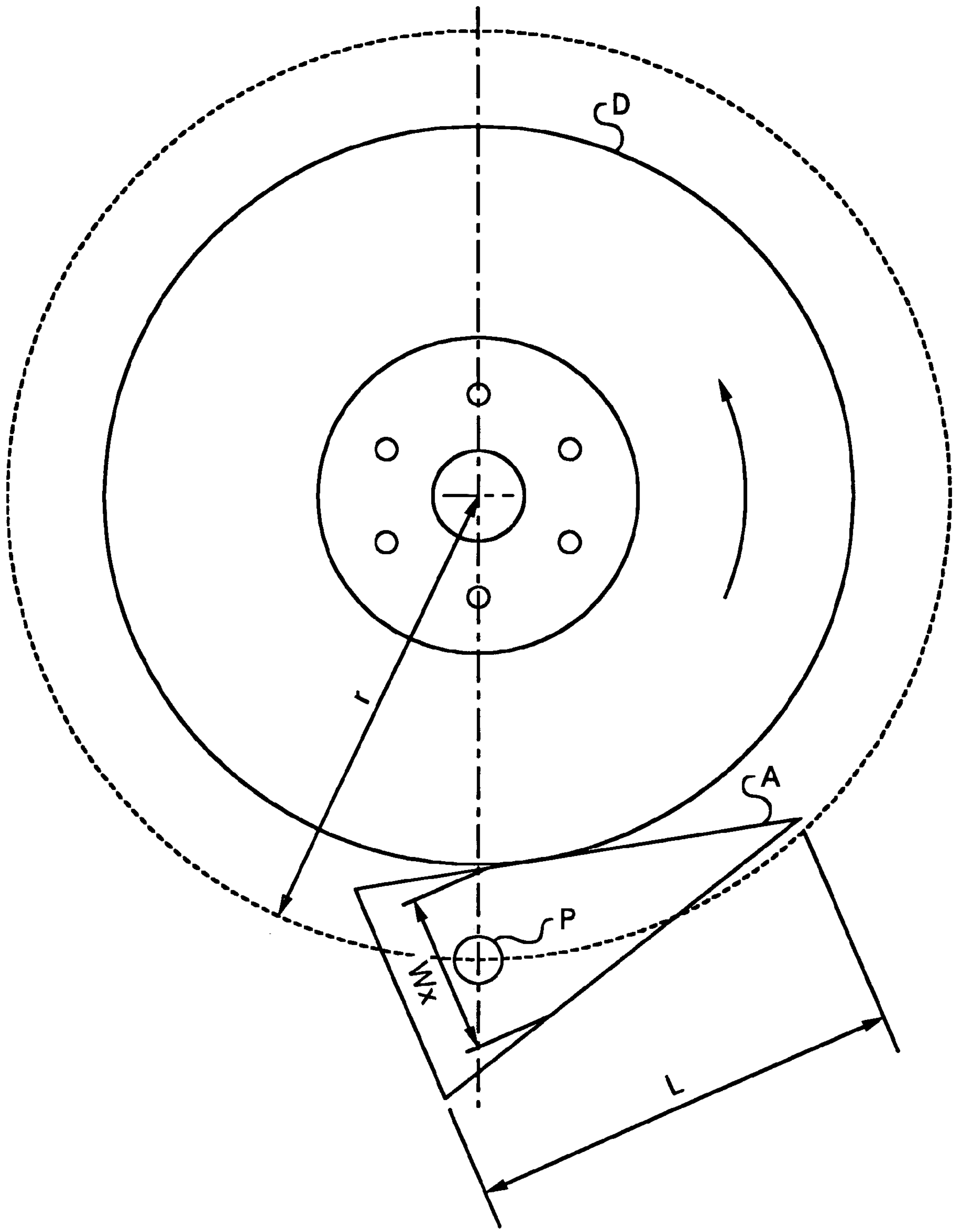
FIG. 8 is an illustration showing a case in which a pivot of an actuator is set to a width-directional center of a housing of an HDD.
Figure 9:
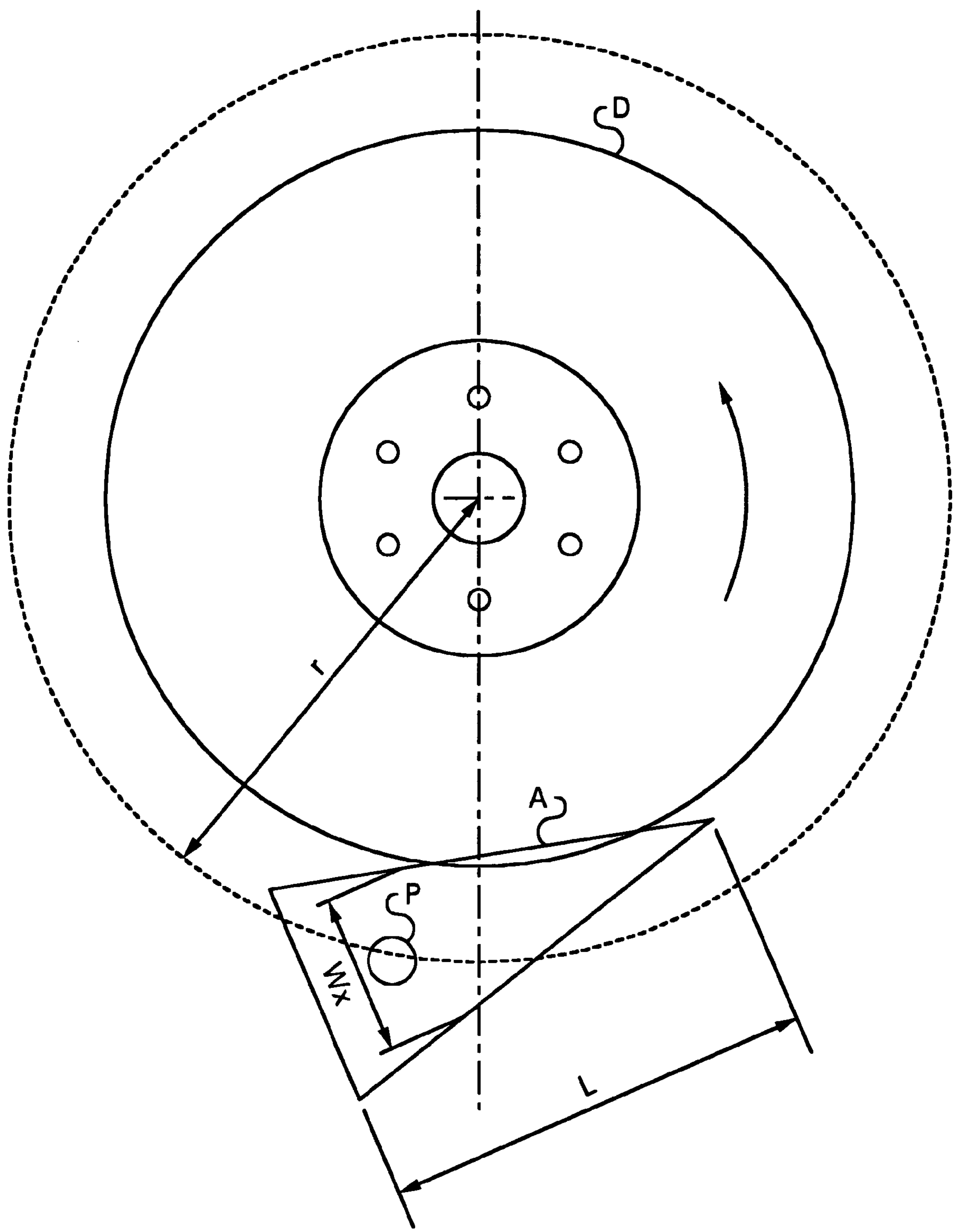
FIG. 9 is an illustration showing a case in which the pivot of the actuator is set to a position eccentric in a direction opposite to a rotational direction of a magnetic disk from the width-directional center of the housing of the HDD.
Figure 10:
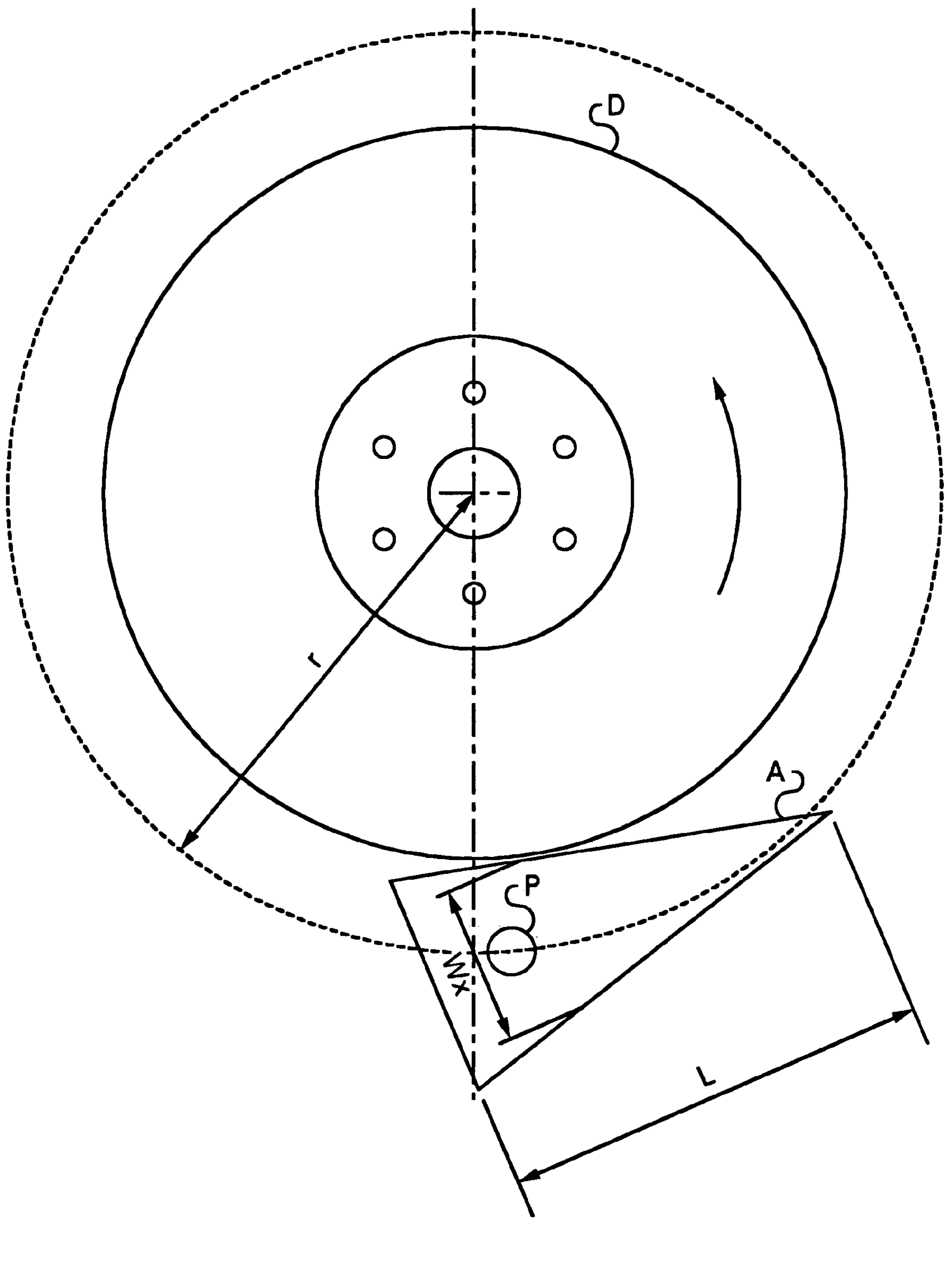
FIG. 10 is an illustration showing a case in which the pivot of the actuator is set to a position eccentric in the rotational direction of a magnetic disk from the width-directional center of the housing of the HDD.

The reason that the width of the arm can be increased by setting the bidirectional-rotation axis of the actuator eccentrically in the rotational direction of the discoid medium is described by referring to FIGS. 8 to 10. FIGS. 8 to 10 are top views schematically showing a discoid medium D and an actuator A. Then, FIG. 8 shows an example in which a pivot (bidirectional-rotation axis) P of the actuator A is set to the width-directional center of a housing shown by an alternate long and short dash line. FIG. 9 shows an example in which the pivot P of the actuator A is set eccentrically in the direction opposite to the rotational direction (shown by an arrow in FIG. 9) of a discoid medium D from the width-directional center of the housing. FIG. 10 shows an example in which the pivot P of the actuator A is set eccentrically in the rotational direction of the discoid medium D from the width-directional center of the housing. In FIGS. 8 to 10, it is assumed that the distance r from the rotational center of the discoid medium D up to the pivot P of the actuator A and the length L of the actuator are constant. Moreover, in general, a portion of the actuator A at the magnetic head side of the pivot P is referred to as arm. The present invention also follows the above mentioned and assumes the width of the arm as Wx which is constant.

By assuming the above mentioned, it is described below whether the width of the arm of the actuator A can be increased when positions of the pivot P of the actuator A are changed while referring to FIGS. 8 to 10.

Examples in FIGS. 9 and 10 are compared on the basis of the example shown in FIG. 8 in which the pivot P of the actuator A is set to the width-directional center of the housing. In FIG. 8, the actuator A contacts with the discoid medium D. FIG. 9 shows the state in which the pivot P of the actuator A is decentered in the direction opposite to the rotational direction of the discoid medium D from the width-directional center of the housing while keeping the angle of the actuator A. It is found that the actuator A overlaps with the discoid medium D. The overlapped portion is blackened. FIG. 10 shows the state in which the pivot P of the actuator A is decentered in the rotational direction of the discoid medium D from the width-directional center of the housing while keeping the angle of the actuator A. It is found that a gap is formed between the actuator A and the discoid medium D.

In this case, when setting the actuator A to the HDD, the discoid medium D is already set. The actuator A is set from the upper side of the HDD. Therefore, if the actuator A overlaps with the discoid medium D, it is impossible or not easy to set the actuator A to the HDD. In the case of FIG. 9, unless the width Wx of the arm is decreased so that the actuator A overlaps with the discoid medium D, it is difficult to set the actuator A to the HDD. This represents that it is possible to more easily increase the width Wx of the arm by setting the pivot P of the actuator A to the above width-directional center compared to the case of setting the pivot P to the position eccentric in the direction opposite to the rotational direction of the discoid medium D from the width-directional center of the housing. Then, FIG. 10 suggests that it is possible to increase the width Wx of the arm by setting the pivot P of the actuator A to a position eccentric in the rotational direction of the discoid medium D from the above width-directional center.

Because not only the discoid medium D and actuator A but also many other parts are set to the HDD, it is necessary to consider the overlap with these parts when setting the actuator A. Therefore, it is difficult to set the actuator A at an optional angle. Therefore, as described above, positions of the pivot P of the actuator A are changed while keeping the angle of the actuator A.

According to the disk drive system of the present invention, it is possible to increase the width of the actuator because the bidirectional-rotation axis of the actuator is set eccentrically in the rotational direction of the discoid medium from the width-directional center of the housing. Therefore, it is possible to improve the rigidity of the actuator and resultantly contribute to improvement of the data read/write speed.

Moreover, in the case of a disk drive system of the present invention, the size of the discoid medium is smaller than that of a discoid medium corresponding to the form factor of the housing. Therefore, even when the rotational speed of the discoid medium is increased, it is possible to suppress increase of the power consumption. Because the size of the discoid medium is small, it is possible to form a new space in the housing. It is also possible to increase the capacity of the actuator and improve the seek speed of a head by using the space.

Furthermore, the present invention provides a hard disk drive comprising a disk assembly in which a magnetic disk having a diameter of 75 mm or less to magnetically store data is set to a spindle so as to be rotatable, a rotary actuator which has a magnetic head for storing or reproducing data in or from the magnetic disk, seeks the magnetic head on the magnetic disk, and bidirectionally rotates about its pivot, and a 3.5"-form-factor enclosure case which has a predetermined width and houses the disk assembly and the rotary actuator, characterized in that the spindle and the pivot are set to the width-directional center of the enclosure case or eccentrically in the rotational direction of the magnetic disk from the width-directional center.

According to the hard disk drive, because the spindle and pivot are set to the width-directional center of the enclosure case or eccentrically in the rotational direction of the magnetic disk from the center, it is possible to suppress a thermal tilt and increase the width of the arm of the actuator.

In the case of a hard disk drive of the present invention, a magnetic disk superior in the balance between power consumption and storage capacity is obtained by selecting the diameter of a magnetic disk in a range of 68 to 72 mm.

By using the above present invention, it is possible to provide a hard disk drive comprising a disk assembly in which a magnetic disk having a diameter of 60 to 75 mm to magnetically store data is set to a spindle so as to be rotatable, a spindle motor for rotating the disk assembly and having a rated rotational speed of 12,000 rpm or more, a rotary actuator which has a magnetic head for storing or reproducing data in or from the magnetic disk, seeks the magnetic head on the magnetic disk, and bidirectionally rotates about its pivot, and a 3.5"-form-factor enclosure case which houses the disk assembly and the rotary actuator.

Figure 6A:
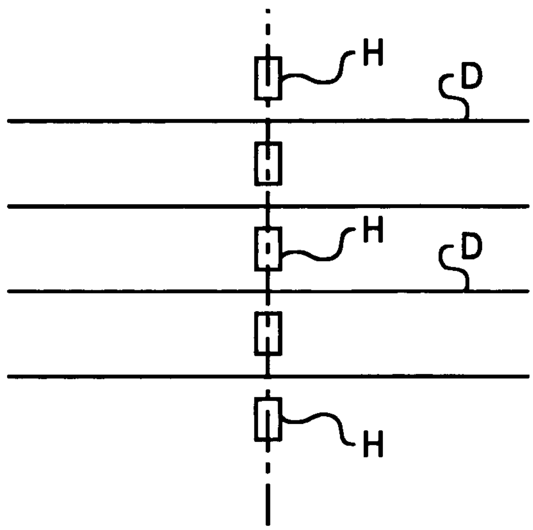
FIGS. 6A and 6B are illustrations for explaining a thermal tilt.
Figure 6B:
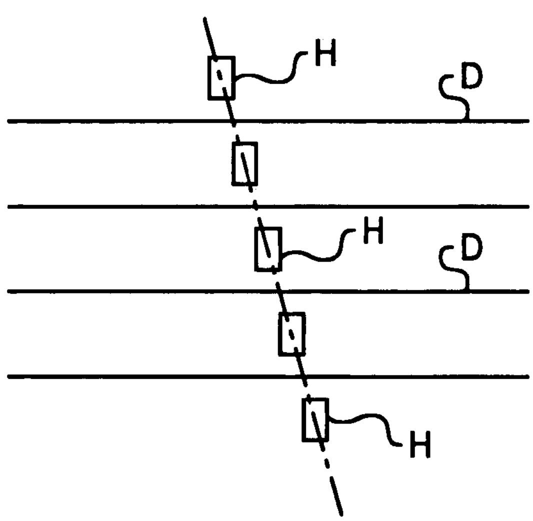

It is possible to improve the data read/write speed by increasing the rotation of a magnetic disk. However, there are causes for interrupting the increase of the speed. A thermal tilt is one of the causes. Most current HDDs respectively have a structure in which a plurality of magnetic disks (e.g. four to 6 disks) are arranged on the same axis. Because data is read or write from or in the magnetic disks, an HDD has magnetic heads corresponding to the number of magnetic disks. Because a magnetic disk has a storage area on its surface and back, the number of magnetic heads two times larger than the number of magnetic disks is prepared. These magnetic heads are designed so as to be arranged on a straight line vertical to a magnetic disk in order to write or read continuous data groups in or from the same cylinder. FIG. 6A schematically shows a state in which magnetic heads H are arranged on a straight line vertical to magnetic disks D. However, a plurality of magnetic heads H that must be present on a vertical straight line may cause a positional shift due to an external cause. FIG. 6B shows the above state. Then, the positional shift of the magnetic heads H is referred to as tilt. Though there are some causes in which a tilt occurs, a thermal tilt is a tilt caused by the difference between linear-expansion coefficients of materials constituting an HDD. When an excessive number of tilts occurs, data read or write speed is lowered because it is necessary to seek the magnetic head H on a track from or in which data should be originally read or written. Therefore, to sufficiently obtain the advantages by increase of the rotation of a magnetic disk, it is necessary to suppress the thermal tilt.

Moreover, excessively high or low rigidity of an actuator, particularly a portion referred to as arm is other cause for preventing improvement of data read/write speed. A magnetic head is set to the front end of an arm. When the arm has an excessively low rigidity, vibration easily occurs in the arm and resultantly, the vibration influences the magnetic head. The vibration of the magnetic head lowers the speed for the magnetic head to seek a predetermined track. Therefore, by increasing the rigidity of the arm, it is possible to prevent the seek speed from lowering. To increase the rigidity of the arm, it is preferable to increase the arm in thickness or width. However, because parts constituting an HDD are set in an enclosure case at a high density or from the viewpoint of an assembling process, it is not easy to increase an arm in thickness or width. Even if it is possible to increase an arm in thickness or width, other performances may be sacrificed.

The present invention is achieved to solve the above problems and its object is to provide a disk drive system capable of sufficiently obtaining the advantage of improving the read/write speed when accelerating the rotation of a discoid medium represented by a magnetic disk. More specifically, it is an object of the present invention to provide a disk drive system capable of sufficiently obtaining the advantage that the read/write speed is improved by suppressing the occurrence of a thermal tilt. Moreover, it is an object of the present invention to provide a disk drive system capable of sufficiently obtaining the advantage that the read/write speed is improved by using the structure of a disk drive system capable of increasing the rigidity of an arm.

Figure 1:
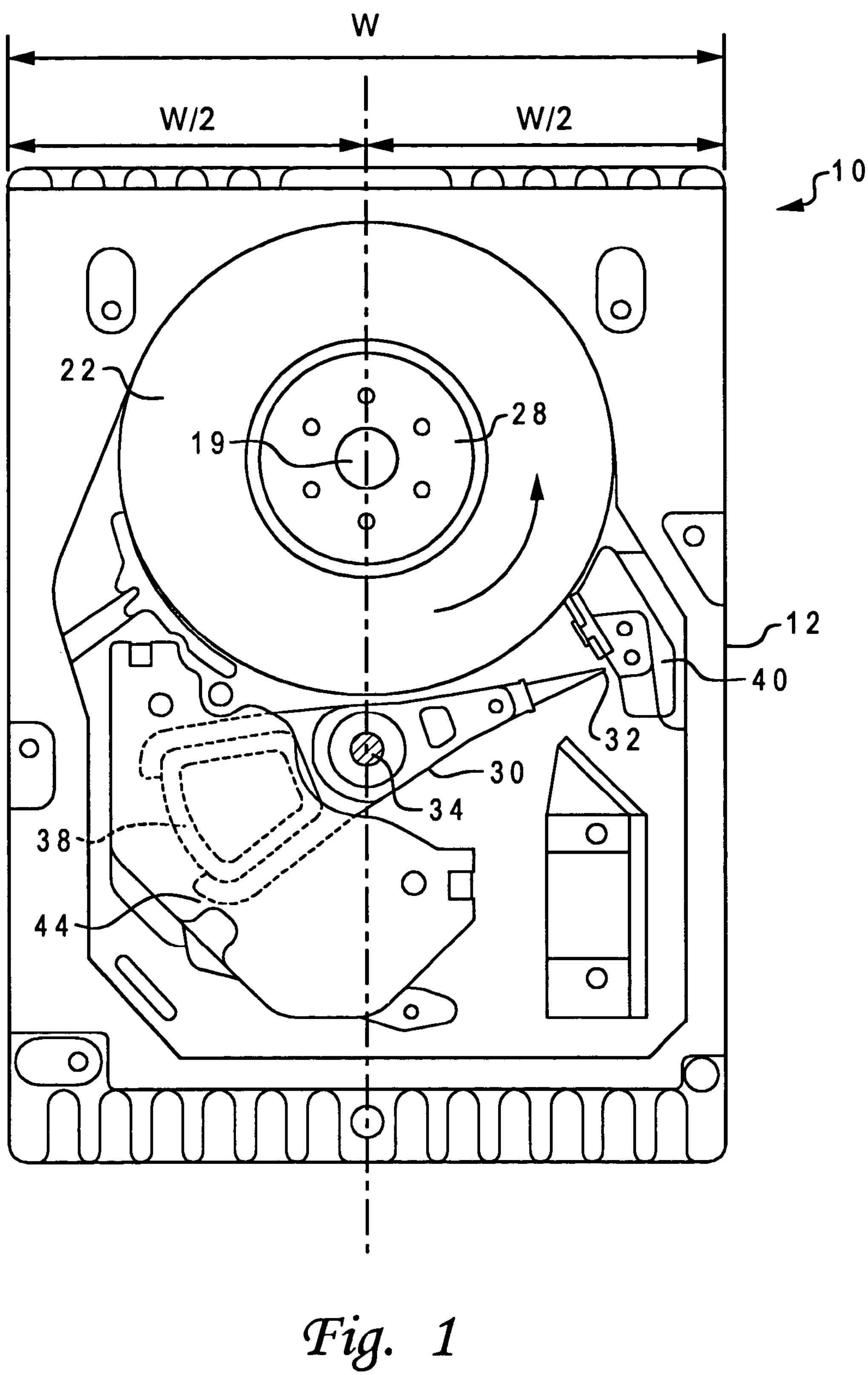
FIG. 1 is a top view showing an HDD of a first embodiment of the present invention.
Figure 2:
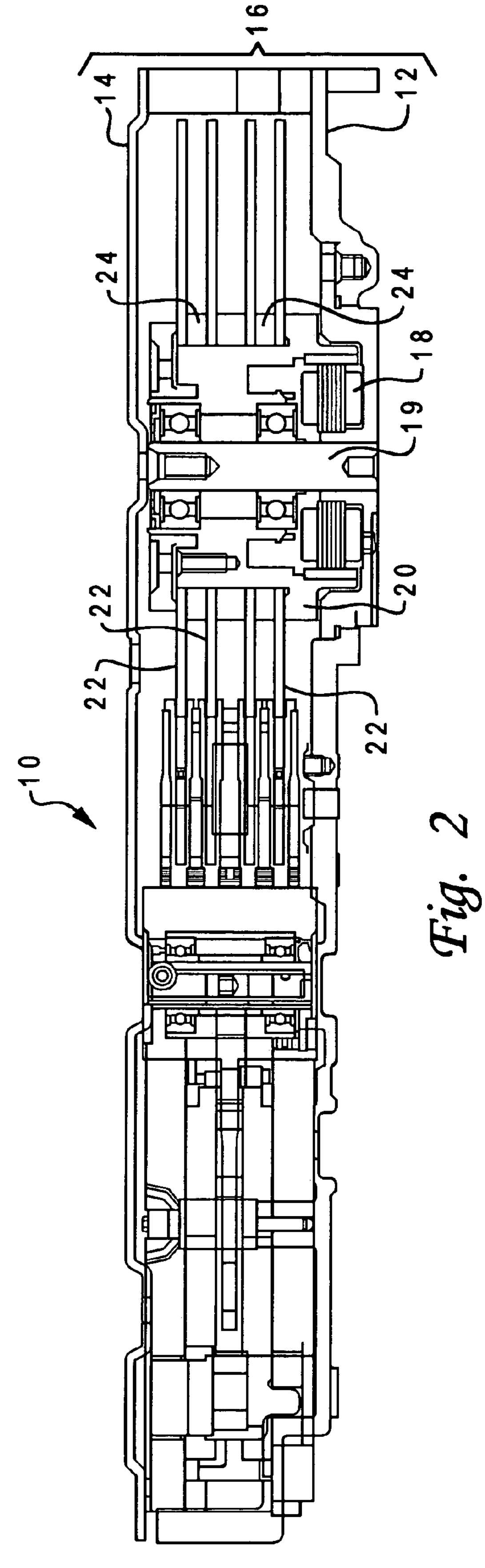
FIG. 2 is a side sectional view showing the HDD of the first embodiment of the present invention.

Alternate embodiments of the present invention will be described herein below with reference to the accompanying drawings. FIG. 1 is a top view showing a hard disk drive (HDD) 10 in accordance with a first embodiment and FIG. 2 is a side sectional view of the hard disk drive in FIG. 1. The HDD 10 is a head-load/unload type HDD. The HDD 10 has a form factor of 3.5" and a rated rotational speed of 15,000 rpm.

As shown in FIGS. 1 and 2, the HDD 10 forms a housing, that is, an enclosure case 16 by sealing the open upper portion of a shallow-bottom aluminum-alloy base 12 with a not-illustrated top cover 14. The enclosure case 16 is a rectangular thin box which can be typically horizontally set in a computer or keyboard. The width of the enclosure case 16 is shown by W in FIG. 1 and the arrow provided with W in FIG. 1 shows the width direction of the enclosure case 16. The top cover 14 is set to the base 12 by machine screws through a rectangular-frame-like sealing member (not illustrated) and thereby, the inside of the enclosure case 16 is made airtight.

A spindle motor 18 having a hub-in structure is set in the enclosure case 16 at a position slightly close to an end of the base 12 from its center. A magnetic disk 22 constituted of a glass substrate or aluminum substrate is fixed to the upper face of a hub 20 of the spindle motor 18 by a top clamp 28 and rotated by the spindle motor 18. The magnetic disk 22 has an outside diameter of 70 mm. The upper end of a spindle 19 of the spindle motor 18 is fixed to the top cover 14 by a not-illustrated bolt. Therefore, the spindle 19 has a both-end-supported structure.

The magnetic disk 22 is a discoid storage medium for storing data. Data is stored in a magnetic thin film (not illustrated) formed on a glass substrate. As shown in FIG. 2, a spacer 24 is set between adjacent magnetic disks 22. The spacer 24 is a member for controlling the interval between the magnetic disks 22. Moreover, an actuator 30 is set in the enclosure case 16. A magnetic head 32 is set to one end of the actuator 30 and the intermediate portion of the actuator 30 is supported onto the base 12 through a pivot 34. Therefore, the actuator 30 can rotate about the pivot 34. A VCM (voice coil motor) coil 36 is set to the other end of the actuator 30 and the actuator 30 is bidirectionally rotated by a VCM 44 set in the enclosure case 16 so as to interlock with the VCM coil 36.

A not-illustrated card serving as a circuit board is set to the outer face (lower face) of the base 12 and is a rectangle having a size for covering the outer face of the base 12. Power and signals for driving the spindle motor 18 are input/output between the card and the motor 18 and power and signals for driving the VCM coil 36 and reading data from the magnetic head 32 are input/output between the card and the actuator 30. Input/output between the card and the actuator 30 is performed through a not-illustrated flexible cable.

The HDD 10 of this embodiment is an HDD referred to as the head load/unload type. The head-load/unload-type HDD 10 unloads the magnetic head 32 to an evacuation position without bringing the magnetic head 32 into contact with the surface of the magnetic disk 22 by making a ramp block 40 hold the actuator 30 while the HDD 10 does not operate. While the HDD 10 operates, the actuator 30 is driven and thereby, the magnetic head 32 is located on the magnetic disk 22.

The HDD 10 of this embodiment is located on the rotation axis of the magnetic disk 22, that is, the spindle 19 of the spindle motor 18 is located at the width-directional center of the enclosure case 16. Moreover, the pivot 34 serving as the bidirectional-rotation center of the actuator 30 is also located at the width-directional center of the enclosure case 16. Therefore, even if the operating-environment temperature of the HDD 10 rises, tilts of the spindle 19 and pivot 34 in the width direction are suppressed.

A thermal tilt was evaluated by preparing a top cover 14 made of brass and a top cover 14 made of a damping steel sheet. For evaluation of the thermal tilt, an HDD (conventional HDD) was also prepared in which the pivot 34 serving as the bidirectional-rotation center of the actuator 30 is set eccentrically in the reverse-rotational direction of the magnetic disk 22 from the width-directional center of the enclosure case 16. Thermal tilts measured by setting the brass top cover 14 to the conventional HDD and the HDD 10 of this embodiment are shown below and it is confirmed that the HDD 10 of this embodiment has a thermal tilt smaller than that of the conventional HDD.

Conventional HDD (Brass top cover 14) . . . 25.6 nm/° C.

HDD 10 (Brass top cover 14) . . . 18.7 nm/° C.

Then, the thermal tilt of the HDD 10 of this embodiment to which the damping-steel-sheet top cover 14 was set was measured. The result is shown below. The damping-steel-sheet top cover 14 has a characteristic superior to the brass top cover 14 from the viewpoint of acoustic characteristic and rigidity. However, the damping-steel-sheet top cover 14 was not adopted because it was excessively different from an aluminum alloy constituting the base 12 in linear-expansion coefficient. However, it was possible to suppress the thermal tilt similarly to the case of the convention HDD to which the brass top cover 14 was set.

HDD 10 (Damping-steel-sheet top cover 14) . . . 28.4 nm/° C.

The HDD 10 also has an advantage that it is superior in fabrication property and workability because the spindle 19 and pivot 34 are located at the width-directional center of the enclosure case 16. For example, it is possible to bore a hole for supporting the spindle 19 through the top cover 14 at a high machining accuracy when the boring position is located at the width-directional center of the top cover 14. Moreover, the base 12 is manufactured by obtaining an element assembly and thereafter machining it. In this case, it is advantageous for the machining accuracy that the spindle 19 of the spindle motor 18 is located at the width-directional center of the base 12.

Moreover, the actuator 30 of the HDD 10 has a straight shape symmetric in the planar direction. Therefore, even if the actuator 30 vibrates, the magnetic head 32 is not easily shifted in the off-track direction though it is shifted in the circumferential direction of the magnetic disk 22.

Figure 7:
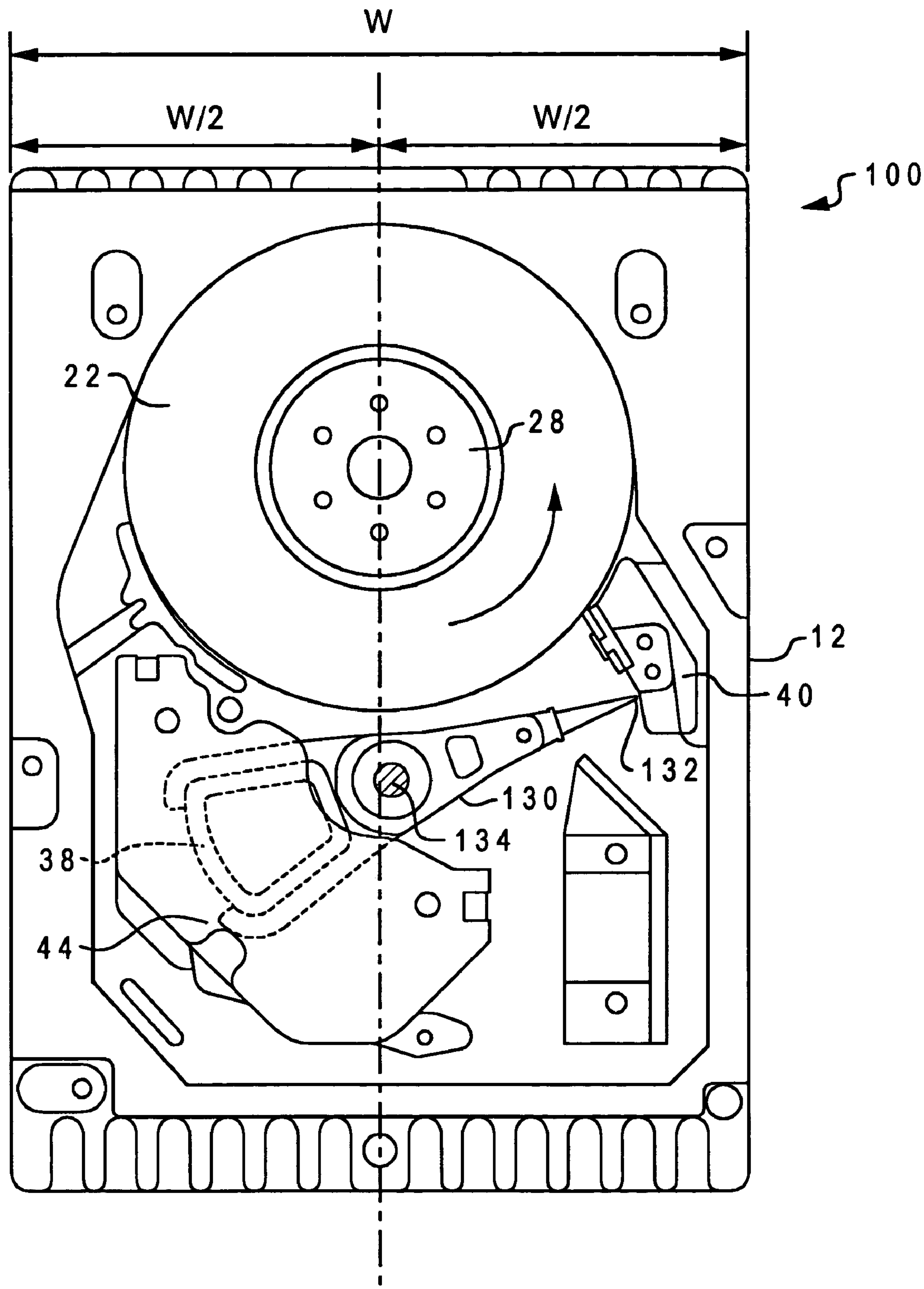
FIG. 7 is a top view showing the HDD of a second embodiment of the present invention.

In a second embodiment of the present invention, an HDD 100 is described with reference to FIG. 7. Because the HDD 100 of the second embodiment has a basic configuration same as that of the HDD 10 of the first embodiment, different points are mainly described. A portion of the HDD 100 same as that of the HDD 10 is provided with the same symbol and its description is omitted.

In the case of the HDD 100, the position of an actuator 130 is different from that of the HDD 10 of the first embodiment. Specifically, the HDD 100 is different from the HDD 10 in that a pivot 134 serving as the bidirectional-rotation axis of the actuator 130 is set eccentrically in the rotational direction of a magnetic disk 22 shown by an arrow in FIG. 7 from the width-directional center of a base 12. Therefore, it is possible to increase the arm width of the actuator 130 compared to the case of the HDD 10. An actuator having a large arm width has a high rigidity and makes it possible to suppress the vibration of a magnetic head 132.

As described above, the present invention provides a disk drive system capable of sufficiently obtaining the advantage that the read/write speed is improved when the rotational speed of a discoid medium represented by a magnetic disk is increased. More specifically, it is possible to provide a disk drive system capable of sufficiently obtaining the advantage that the read/write speed is improved by suppressing occurrence of a thermal tilt. Moreover, by using the structure of a disk drive system capable of improving the rigidity of an arm, it is possible to provide a disk drive system capable of sufficiently obtaining the advantage that the read/write speed is increased.

What is claimed is:

1. A disk drive system comprising:

a discoid medium which rotates about its rotation axis and stores data;

an actuator which has a head for reading or writing data from or in the discoid medium and bidirectionally rotates about its bidirectional-rotation axis; and a housing which has a predetermined width and houses the discoid medium and the actuator, characterized in that the bidirectional-rotation axis of the actuator is set eccentrically in the rotational direction of the discoid medium from the width-directional center of the housing, and the size of the discoid medium is smaller than that of a discoid medium corresponding to the form factor of the housing.

2. The disk drive system according to claim 1, characterized in that the rotation axis of the discoid medium is set to the width-directional center of the housing.

* * * * *